May 13, 1952      F. W. LINDBLOM      2,596,572
TWO-COLOR SPECTACLE BRIDGE
Filed Sept. 29, 1949
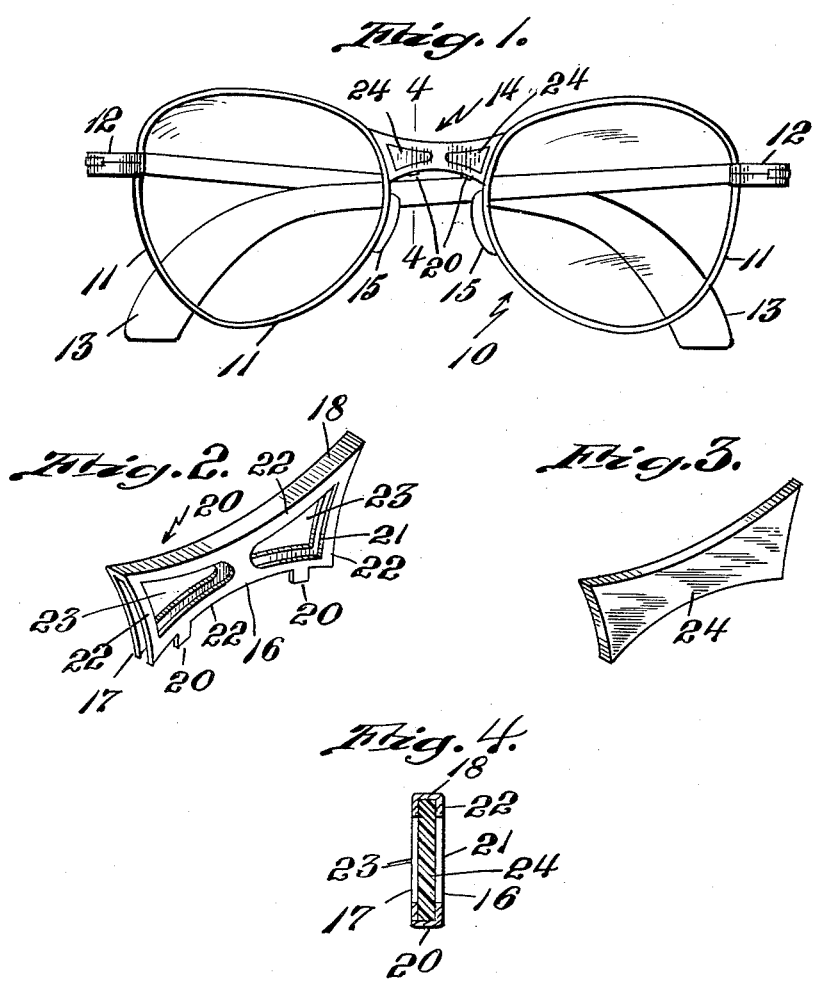
INVENTOR.
Frank W. Lindblom
BY
Barlow & Barlow
ATTORNEYS.

Patented May 13, 1952

2,596,572

UNITED STATES PATENT OFFICE 2,596,572

TWO-COLOR SPECTACLE BRIDGE

Frank W. Lindblom, Warwick, R. I., assignor to Welsh Manufacturing Company, a corporation of Rhode Island Application September 29, 1949, Serial No. 118,697

2 Claims. (Cl. 41—34)

1

This invention relates to an ophthalmic mounting, particularly to the bridge thereof.

The bridge of a metal ophthalmic mounting is usually made solid which often times is provided with markings on the surface thereof simulating engravings whereby to enhance the appearance of the said mounting. The bridge is also usually of the single color of the material of which it is made and its construction is not particularly adapted for decoration by a two-tone color scheme.

An object of this invention is the provision of a metal ophthalmic bridge so constructed as to present a two-tone color scheme decoration.

A more specific object of the invention is to provide a metal ophthalmic bridge of a construction wherein a colored insert may be combined with the bridge to provide the two-tone color scheme.

Another object of the invention is to provide a metal ophthalmic bridge according to the previous object wherein the said insert may be speedily and easily positioned in place at the time of the retail sale of the ophthalmic mounting.

With these and other objects in view, the invention consists of certain novel features of construction, as will be more fully described and particularly pointed out in the appended claims.

In the accompanying drawings:

Figure 1 is a front view of an ophthalmic mounting embodying my invention;

Figure 2 is a perspective view of the bridge of the mounting shown in Figure 1;

Figure 3 is a perspective view of a colored plastic insert for the bridge; and

Figure 4 is a section taken substantially along line 4—4 of Figure 1.

In carrying out my invention I provide an ophthalmic mounting, the bridge of which is substantially channel shaped, providing spaced walls between which an insert, preferably of a non-metallic plastic material, may be received. The said walls may be provided with openings extending therethrough through which the insert may be viewed thereby providing a two-tone color bridge. The wall edge portion surrounding the openings may be chosen to provide pleasing outlines for the openings and thus contribute to enhance the appearance of the bridge.

Referring to the drawings for a more detailed description of the invention, 10 designates generally an ophthalmic mounting comprising lens rims 11 having temple mountings or end pieces 12 for attachment of the temples 13 to the rims. The rims are connected by means of a bridge 14

2 and have the usual nose pads 15 attached thereto.

The bridge 14 comprises spaced similar front and rear walls 16, 17, the upper and lower edges of which are concave. These walls are joined at their upper edge by a laterally extending arcuate wall 18 providing a channel section open at the bottom and at the ends thereof. Spaced tabs 20 extend from the lower edge of the front wall 16. The front wall 16 has spaced openings 21, which are defined by a narrow marginal edge wall or portion 22. The rear wall 17 is similarly provided with openings 23 registering with the said openings 21 in the front wall.

The bridge 14 is attached to the rims 11 at location adjacent the nasal edge thereof by soldering or welding in a well-known manner. The ends of the said frame extend on the curvature of the rim at the point of attachment thereof, thereby providing an extended surface in engagement with the rims.

In the frame 20 there is positioned an insert 24 which is in outline of the general configuration of the contour of the said frame and of a thickness substantially that of the space between the walls 16 and 17. The insert 24 is preferably made of a non-metallic plastic material of any desired color. The insert 24 may be molded or stamped to the required shape and easily positioned in place by sliding the same between the walls 16, 17 and detachably held in place by bending the tabs 20 to extend across the lower edge of the said insert. Thus, there is provided a two-tone ophthalmic bridge wherein the color scheme may be varied by a choice of inserts 24.

It will be apparent that the insert may be speedily and easily positioned and attached to the bridge frame at the time of sale, thus permitting the retailer to advantageously stock a smaller inventory of mountings without inserts therein and a larger inventory of the inserts in a color range to allow for a particular choice of color scheme by the purchaser.

I claim:

1. In an ophthalmic mounting a pair of rims, a hollow bridge connecting the rims, said bridge comprising a body having spaced parallel walls joined at the upper edges thereof with the end edges thereof secured to the said rims to close the ends of said bridge, a colored insert positioned between said walls and between said rims, said walls having openings therein with the portion of the walls about said openings providing a marginal edge about said insert, one of said walls having tabs thereon at the lower edge thereof extending therefrom across the lower edge of said insert for holding the same between said walls.

2. In an ophthalmic mounting as in claim 1 wherein said bridge is metal and said insert is of non-metallic material.

FRANK W. LINDBLOM.

REFERENCES CITED

The following references are of record in the file of this patent:

UNITED STATES PATENTS

| Number | Name | Date |
|---|---|---|
| 248,785 | Pardee | Oct. 25, 1881 |
| 1,932,261 | Beattey | Oct. 24, 1933 |
| 2,067,811 | Baer | Jan. 12, 1937 |

FOREIGN PATENTS

| Number | Country | Date |
|---|---|---|
| 369,355 | Great Britain | Mar. 24, 1932 |
| 466,034 | Great Britain | May 20, 1937 |